UNITED STATES PATENT OFFICE.

ARTHUR ASHWORTH AND JOSHUA BÜRGER, OF BURY, ENGLAND.

BROWN DYE.

SPECIFICATION forming part of Letters Patent No. 548,345, dated October 22, 1895.

Application filed December 4, 1893. Serial No. 492,769. (Specimens.)

*To all whom it may concern:*

Be it known that we, ARTHUR ASHWORTH, chemical manufacturer, and JOSHUA BÜRGER, technical chemist, Fernhill Chemical Works, residing at Bury, England, have invented a new and useful Method for the Production of New Coloring-Matters, of which the following is a specification.

The invention consists in combining nitroso naphthols—either alpha-oxy-beta-nitroso naphthalene, 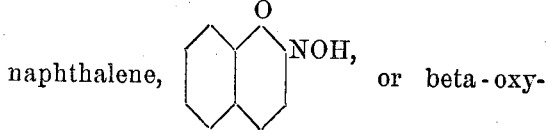 or beta-oxy-alpha-nitroso naphthalene, 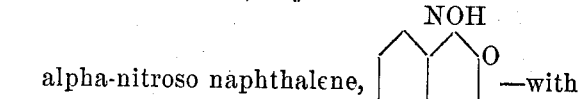 —with tannins or gallic acid by means of condensing agents, as is, for instance, fully demonstrated in the following example: 18.800 parts, by weight, of crystallized gallic acid or seventeen parts, by weight, of dried gallic acid, or 32.200 parts, by weight, of tannin, are gradually mixed with two hundred parts, by weight, of concentrated sulfuric acid 66° Baumé, and when dissolved 17.300 parts, by weight, of alpha-oxy-beta-nitroso naphthalene or beta-oxy-alpha nitroso naphthalene are gradually added to the solution, the mass being continuously stirred and care being taken that the temperature does not rise above 25° centigrade. After all is dissolved the temperature is raised to 40° centigrade, kept at that temperature during one hour, then raised during another hour up to 60° to 70° centigrade, and, finally, kept for two hours at 85° to 90° centigrade. The reaction being finished the mass is cooled down and poured on ice. The coloring-matters precipitate in dark flakes, which are filtered off, washed, made into paste, or dried.

The coloring-matters when dry form a dark powder almost of black appearance, slightly soluble in cold water, more soluble in boiling water, slightly soluble in alcohol, and almost insoluble in ether, soluble in dilute caustic soda with a brown color, soluble in concentrated sulfuric acid with a deep purplish-brown color, from which, on dilution with ice-water, the color is precipitated in dark-brown flakes. They are most suitably used for practical purposes in form of a paste, and produce on chrome mordants brown shades, which when dyed very dark appear almost black, and are of great fastness to light and soap. An addition of bisulfites to the color-paste improves its usefulness.

What we claim as new is—

1. The process herein described of producing coloring matters consisting of adding ortho oxy beta nitroso naphthalene to a solution of tannin in a condensing agent, such as sulfuric acid, and heating the resulting mixture, substantially as specified.

2. The new dye consisting of a dark powder of nearly black appearance, slightly soluble in cold water, alcohol and almost insoluble in ether, more soluble in boiling water, soluble in cold dilute caustic soda with a brown color, soluble in concentrated sulfuric acid with a deep purplish brown solution, which on addition of ice separates dark brown flakes, producing on chrome mordants brown shades, substantially as described.

ARTHUR ASHWORTH.
JOSHUA BÜRGER.

Witnesses:
ARTHUR C. HALL,
JOHN W. THOMAS.